(12) United States Patent
Zuccarino et al.

(10) Patent No.: US 9,418,079 B2
(45) Date of Patent: Aug. 16, 2016

(54) IMAGE COMPARISON PROCESS

(71) Applicant: Google Inc., Mountain View, CA (US)

(72) Inventors: Scott Zuccarino, San Francisco, CA (US); Doug Sherrets, New York, NY (US); Yumio Saneyoshi, Belmont, CA (US)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 14/067,261

(22) Filed: Oct. 30, 2013

(65) Prior Publication Data

US 2014/0122531 A1  May 1, 2014

Related U.S. Application Data

(60) Provisional application No. 61/721,169, filed on Nov. 1, 2012.

(51) Int. Cl.
*G06F 17/30* (2006.01)

(52) U.S. Cl.
CPC .... *G06F 17/30265* (2013.01); *G06F 17/30247* (2013.01)

(58) Field of Classification Search
CPC .................. G06F 17/30265; G06F 17/30247; G06F 17/30; G06F 11/1471; G06F 17/30563; G06F 17/30569; G06F 2201/84; G06F 17/30256; G06F 17/30259; G06F 17/30277; G06F 17/3028; G06F 3/04842; G06F 17/30253; G06F 3/0484; G06K 9/6217; G06K 9/00268; H04L 67/141; H04L 41/22; H04L 67/22; H04L 51/20; H04L 51/32; G06Q 10/00; G06Q 50/01
USPC ........... 707/780; 709/204, 206; 382/190, 209, 382/115; 705/7.29
See application file for complete search history.

(56) References Cited

U.S. PATENT DOCUMENTS

| | | | |
|---|---|---|---|
| 7,702,821 B2 * | 4/2010 | Feinberg | G06F 9/445 710/13 |
| 7,903,904 B1 | 3/2011 | Loeb et al. | |
| 8,296,291 B1 | 10/2012 | Desjardins | |
| 2003/0195883 A1 * | 10/2003 | Mojsilovic et al. | 707/6 |
| 2005/0135667 A1 * | 6/2005 | Saarela et al. | 382/141 |
| 2006/0253491 A1 | 11/2006 | Gokturk | |
| 2007/0169182 A1 * | 7/2007 | Wolfond | G06F 21/31 726/7 |
| 2007/0179918 A1 * | 8/2007 | Heisele et al. | 706/13 |
| 2008/0082548 A1 * | 4/2008 | Betts | G06Q 10/10 707/E17.001 |
| 2008/0309777 A1 * | 12/2008 | Aoyama | G06K 9/00228 348/222.1 |
| 2010/0091330 A1 * | 4/2010 | Marchesotti et al. | 358/1.18 |
| 2010/0226564 A1 * | 9/2010 | Marchesotti | G06F 17/30256 382/159 |

(Continued)

OTHER PUBLICATIONS

Kontaxis et al.—"Detecting Social Network Profile Cloning"—Published in: Pervasive Computing and Communications Workshops (PERCOM Workshops), 2011 IEEE International Conference on—Date of Conference: Mar. 21-25, 2011, Seatle, WA—pp. 295-300.*

(Continued)

*Primary Examiner* — Anh Ly

(57) ABSTRACT

A computer-implemented method and computing system for comparing, on a computing device, data concerning a first image within a social network to data concerning a plurality of images within the social network. A subset of similar images is identified, chosen from the plurality of images, based, at least in part, upon the comparison. At least a portion of the subset is presented to a computing device associated with a user.

20 Claims, 5 Drawing Sheets

(56) References Cited

U.S. PATENT DOCUMENTS

| | | | |
|---|---|---|---|
| 2010/0226566 A1* | 9/2010 | Luo et al. ................... 382/164 |
| 2010/0322210 A1* | 12/2010 | Minapalli ......... H04W 72/0493 370/337 |
| 2010/0332475 A1* | 12/2010 | Birdwell ........... G06F 17/30333 707/737 |
| 2011/0029561 A1 | 2/2011 | Slaney et al. |
| 2011/0034176 A1* | 2/2011 | Lord ................ G06F 17/30244 455/450 |
| 2011/0099199 A1 | 4/2011 | Stalenhoef |
| 2011/0106845 A1* | 5/2011 | Lipson et al. ................ 707/769 |
| 2011/0116690 A1* | 5/2011 | Ross et al. .................... 382/118 |
| 2011/0153412 A1* | 6/2011 | Novikov et al. ........... 705/14.42 |
| 2011/0211737 A1 | 9/2011 | Krupka |
| 2011/0239282 A1* | 9/2011 | Svarfvar ............. H04L 63/0815 726/5 |
| 2011/0289011 A1* | 11/2011 | Hull et al. ..................... 705/319 |
| 2012/0072493 A1* | 3/2012 | Muriello ................ G06Q 50/01 709/204 |
| 2012/0076367 A1 | 3/2012 | Tseng |
| 2012/0076427 A1* | 3/2012 | Hibino ............... G06K 9/00671 382/218 |
| 2012/0084731 A1 | 4/2012 | Filman |
| 2012/0213404 A1 | 8/2012 | Steiner |
| 2013/0044959 A1* | 2/2013 | Mitchell ................ G06Q 30/02 382/217 |
| 2013/0110865 A1* | 5/2013 | Preetham .......... G06F 17/30268 707/769 |
| 2013/0148864 A1* | 6/2013 | Dolson ............. G06F 17/30265 382/115 |
| 2013/0262588 A1* | 10/2013 | Barak ..................... H04L 67/22 709/204 |
| 2013/0282821 A1* | 10/2013 | Muriello .......... H04N 21/44008 709/204 |
| 2013/0297464 A1* | 11/2013 | Jaquez et al. .................... 705/28 |
| 2013/0304646 A1* | 11/2013 | de Geer .......................... 705/44 |
| 2014/0181205 A1* | 6/2014 | Sherrets ................. G06Q 50/01 709/204 |
| 2014/0195921 A1* | 7/2014 | Grosz ................... G06F 3/1242 715/738 |
| 2014/0233811 A1* | 8/2014 | Murphy-Chutorian G06K 9/6267 382/118 |
| 2015/0073929 A1* | 3/2015 | Psota et al. ................... 705/26.2 |

OTHER PUBLICATIONS

Jia Li et al.—"New Challenges in Multimedia Research for the Increasingly Connected and Fast Growing Digital Society"—MIR'07, Sep. 28-29, 2007, Augsburg, Bavaria, Germany—Proceeding MIR '07 Proceedings of the international workshop on Workshop on multimedia information retrieval—pp. 3-10.*
International Search Report & Written Opinion, dated Feb. 26, 2014, for related PCT Application No. PCT/US2013/067527.
KIPO Korean Office Action mailed in KR Application No. 10-2015-7011578, Apr. 1, 2016.
"Notice of Reasons for Rejection", for Japanese Application No. 2015-540749, Apr. 18, 2016.
EPO Supplementary European Search Report received for EP Application No. 3851858.4, May 30, 2018, 5 pages.

* cited by examiner

IMAGE COMPARISON PROCESS

CROSS-REFERENCE TO RELATED APPLICATION

This application claims the benefit of U.S. Provisional Application Ser. No. 61/721,169, filed 1 Nov. 2012, of which the entire contents are incorporated herein by reference.

TECHNICAL FIELD

This disclosure relates to comparing images and, more particularly, to comparing data associated with images.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs.

Through the use of such social networks, users may exchange content such as photographs. Further, users may discuss and provide commentary on such photographs.

SUMMARY OF DISCLOSURE

In a first implementation, a computer-implemented method includes receiving, on a computing device, data concerning a first image within a social network. The data concerning the first image is posted within the social network. The data concerning the first image within the social network is compared, on the computing device, to data concerning a plurality of images within the social network. A subset of similar images is identified, chosen from the plurality of images, based, at least in part, upon the comparison. Identifying a subset of similar images includes analyzing similarities between data concerning the first image within the social network and data concerning the plurality of images within the social network to generate the subset. At least a portion of the subset is presented to a computing device associated with a user.

In another implementation, a computer-implemented method includes comparing, on a computing device, data concerning a first image within a social network to data concerning a plurality of images within the social network. A subset of similar images is identified, chosen from the plurality of images, based, at least in part, upon the comparison. At least a portion of the subset is presented to a computing device associated with a user.

One or more of the following features may be included. The data concerning the first image may be received. The data concerning the first image may be posted within the social network. The data concerning the first image may include metadata concerning the first image. The data concerning the first image may include user comments concerning the first image. The data concerning the plurality of images may include metadata concerning the plurality of images. The data concerning the plurality of images may include user comments concerning the plurality of images.

Identifying a subset of similar images may include analyzing social affinity between a user associated with the first image and one or more users associated with the plurality of images. Identifying a subset of similar images may include analyzing similarities between data concerning the first image within the social network and data concerning the plurality of images within the social network. Identifying a subset of similar images may include analyzing one or more credentials of a user associated with one or more of the plurality of images within the social network.

In another implementation, a computing system includes a processor and memory configured to perform operations including comparing data concerning a first image within a social network to data concerning a plurality of images within the social network. A subset of similar images is identified, chosen from the plurality of images, based, at least in part, upon the comparison. At least a portion of the subset is presented to a computing device associated with a user.

One or more of the following features may be included. The data concerning the first image may be received. The data concerning the first image may be posted within the social network. The data concerning the first image may include metadata concerning the first image. The data concerning the first image may include user comments concerning the first image. The data concerning the plurality of images may include metadata concerning the plurality of images. The data concerning the plurality of images may include user comments concerning the plurality of images.

Identifying a subset of similar images may include analyzing social affinity between a user associated with the first image and one or more users associated with the plurality of images. Identifying a subset of similar images may include analyzing similarities between data concerning the first image within the social network and data concerning the plurality of images within the social network. Identifying a subset of similar images may include analyzing one or more credentials of a user associated with one or more of the plurality of images within the social network These and other aspects of this disclosure may provide one or more advantages. For example, uses may include identifying photos that are related to each other, as well as identifying photos that are exactly the same. Information such as comments may be aggregated for the user to view, whether right after posting the content or later when viewing the content. When aggregated, ranking may be done on the posts that are shared about the related or same photos, including accounting for feedback on the posts such as reshares/comments, affinity to people who have posted, the nature of the comment such as if people have responded to it with keywords indicating sentiment by saying things like "funny," "wow," etc."

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
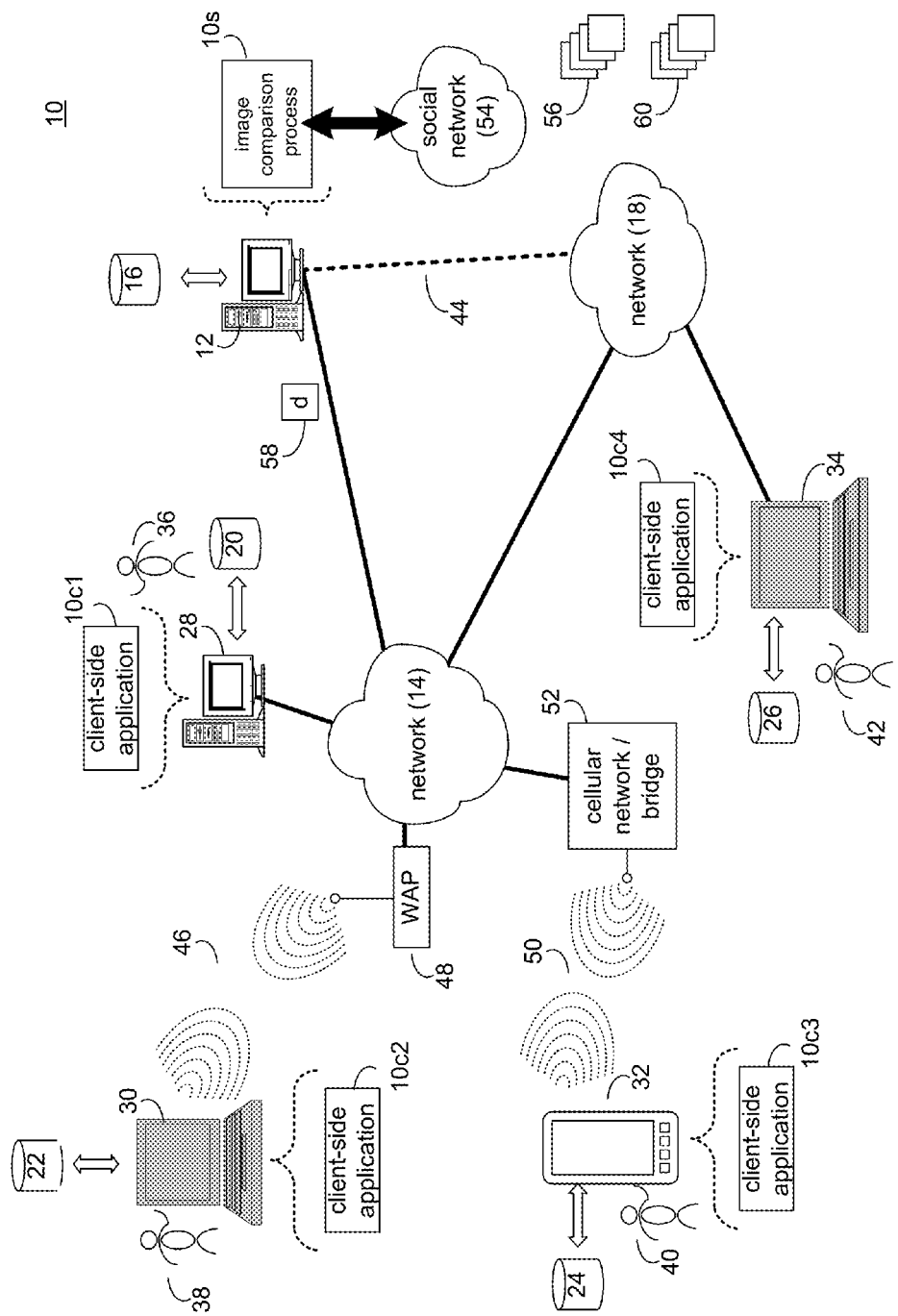
FIG. 1 is a diagrammatic view of a distributed computing network including a computing device that executes an image comparison process according to an embodiment of the present disclosure.

Referring to FIG. 1, there is shown image comparison process 10. For the following discussion, it is intended to be understood that image comparison process 10 may be implemented in a variety of ways. For example, image comparison process 10 may be implemented as a server-side process, a client-side process, or a server-side/client-side process.

For example, image comparison process 10 may be implemented as a purely server-side process via image comparison process 10s. Alternatively, image comparison process 10 may be implemented as a purely client-side process via one or more of client-side application 10c1, client-side application 10c2, client-side application 10c3, and client-side application 10c4. Alternatively still, image comparison process 10 may be implemented as a server-side/client-side process via image comparison process 10s in combination with one or more of client-side application 10c1, client-side application 10c2, client-side application 10c3, and client-side application 10c4.

Accordingly, image comparison process 10 as used in this disclosure may include any combination of image comparison process 10s, client-side application 10c1, client-side application 10c2, client-side application 10c3, and client-side application 10c4.

Figure 2:
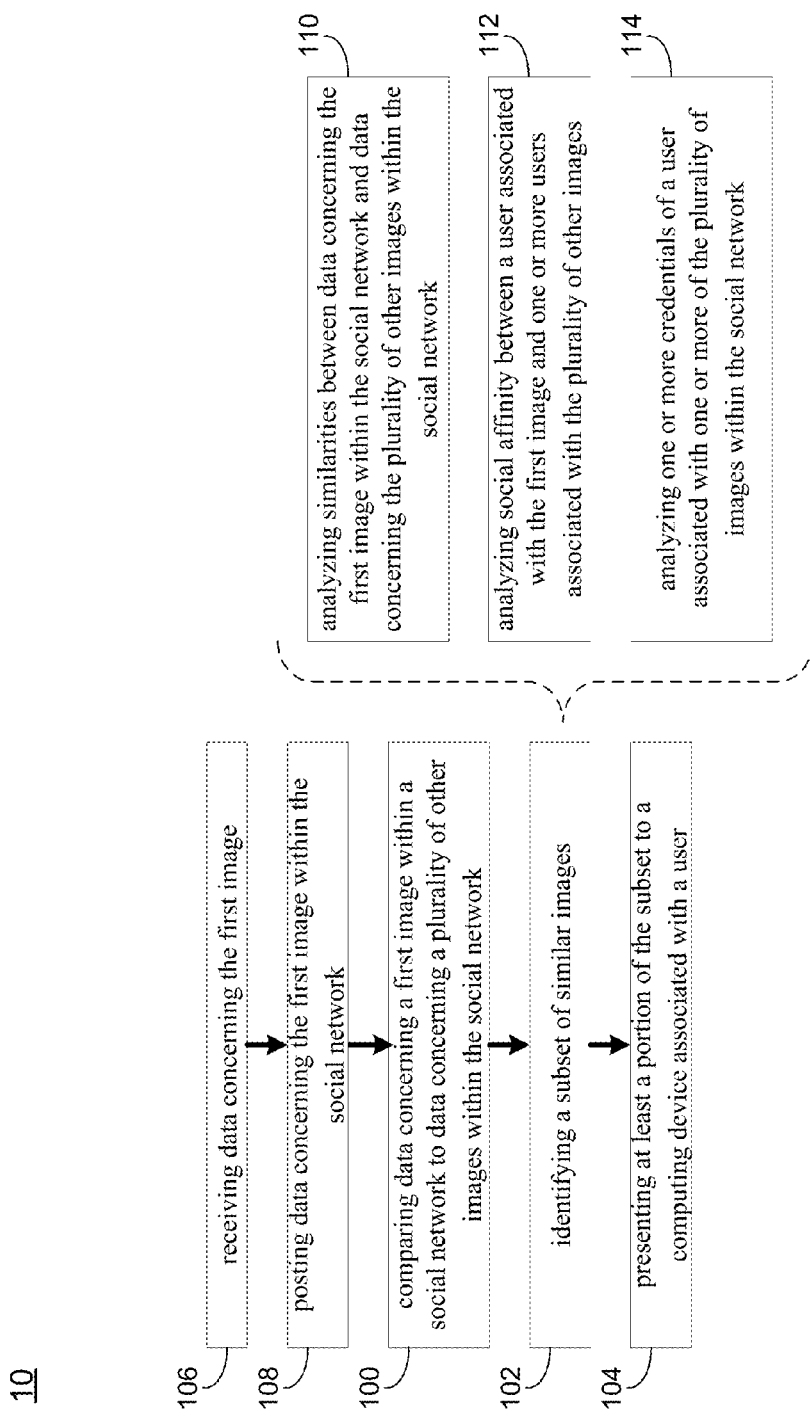
FIG. 2 is a flowchart of the image comparison process of FIG. 1 according to an embodiment of the present disclosure.

Referring also to FIG. 2 and as will be discussed below in greater detail, image comparison process 10 may compare 100 data concerning a first image within a social network to data concerning a plurality of images within the social network. Image comparison process 10 may identify 102 a subset of similar images, chosen from the plurality of images, based, at least in part, upon the comparison. Further, image comparison process 10 may present 104 at least a portion of the subset to a computing device associated with a user.

Image comparison process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of image comparison process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, desktop computer 28, laptop computer 30, data-enabled, cellular telephone 32, notebook computer 34, a server computer (not shown), a personal gaming device (not shown), a data-enabled television console (not shown), a personal music player (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access image comparison process 10 directly through network 14 or through secondary network 18. Further, image comparison process 10 may be accessed through secondary network 18 via link line 44.

The various client electronic devices (e.g., client electronic devices 28, 30, 32, 34) may be directly or indirectly coupled to network 14 (or network 18). For example, desktop computer 28 is shown directly coupled to network 14 via a hardwired network connection. Laptop computer 30 is shown wirelessly coupled to network 14 via wireless communication channel 46 established between laptop computer 30 (respectively) and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Further, data-enabled, cellular telephone 32 is shown wirelessly coupled to network 14 via wireless communication channel 50 established between data-enabled, cellular telephone 32 and cellular network/bridge 52, which is shown directly coupled to network 14. Additionally, notebook computer 34 is shown directly coupled to network 18 via a hardwired network connection.

Image comparison process 10 may be configured to interact with social network 54. Accordingly, image comparison process 10 may be configured to be a portion of/included within social network 54. Alternatively, image comparison process 10 may be configured to be a stand-alone process that interacts with (via e.g., an API) social network 54. Social network 54 may be configured to allow users (e.g., users 36, 38, 40, 42) to post various images (e.g., plurality of images 56) within social network 54 for commentary by other users. Optionally, a user may choose to subscribe to be notified when a similar image or the same image is posted. For example, someone you are connected to on a social network might post a related photo that you would want to see. Another example is that someone closely connected to you in the social graph might post the same image as you and you might want to see the comments.

Figure 3C:
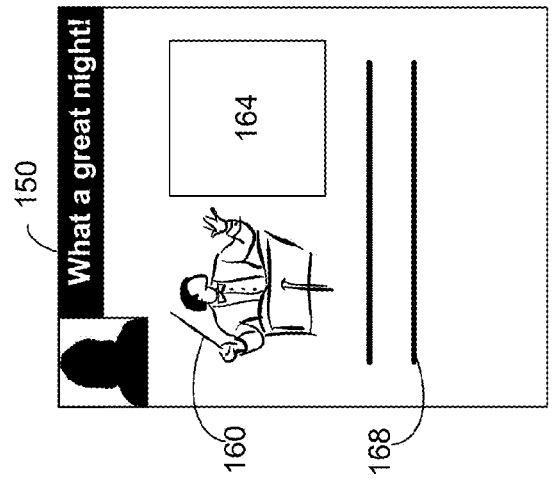
FIGS. 3A-3D are diagrammatic views of a social network user interface according to an embodiment of the present disclosure.
Figure 3B:
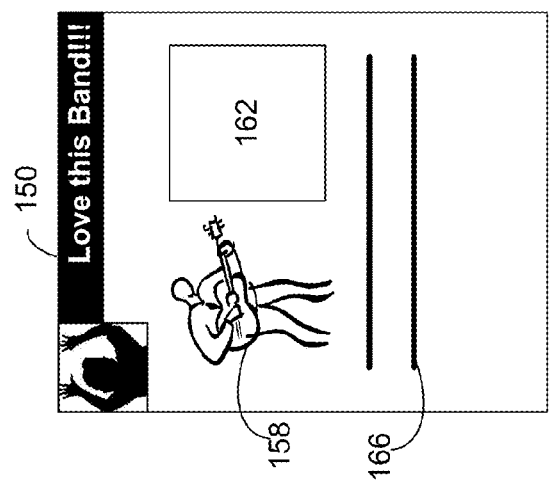
Figure 3A:
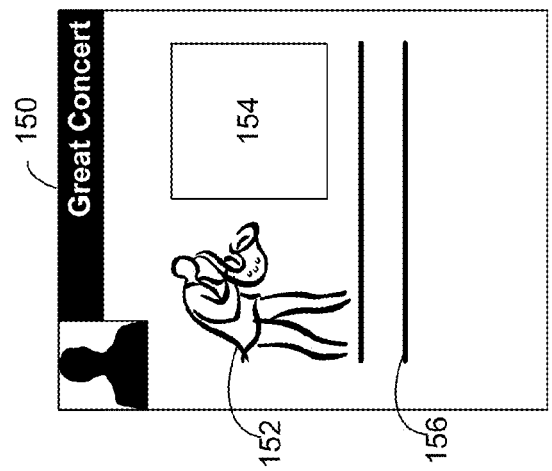

Referring also to FIGS. 3A-3D, assume for illustrative purposes that social network 54 is configured to render user interface 150 for use by users 36, 38, 40, 42 (who are all members of social network 54). Further assume that user 36 posts image 152 (an image of a jazz concert) to social network 54 (as shown in FIG. 3A). One or more of user 36, 38, 40, 42 may provide data 58 concerning image 152. Data 58 may be in the form of metadata concerning image 152 and/or user comments concerning image 152. For example, when posting image 152 to social network 54, user 36 may provide data 58 concerning image 152 (in the form of metadata 154), such as "XYZ Band really rocked The Pier this past Saturday night". Additionally and upon seeing image 152, user 38 may provide data 58 concerning image 152 (in the form of user comments 156), such as "I know, they were amazing last year when I saw them in Jersey". Image comparison process 10 may be configured to receive 106 data 58 concerning image 152 and post 108 data 58 concerning image 152 within (in this example) user interface 150 of social network 54. Metadata may include GPS location, places, people, bands, time, web address, description, comments, social signals, data representing the photo, and/or more. Additionally, assume that similar postings were made within social network 54 concerning image 158 (as shown in FIG. 3B) and image 160 (as shown in FIG. 3C).

Figure 3D:
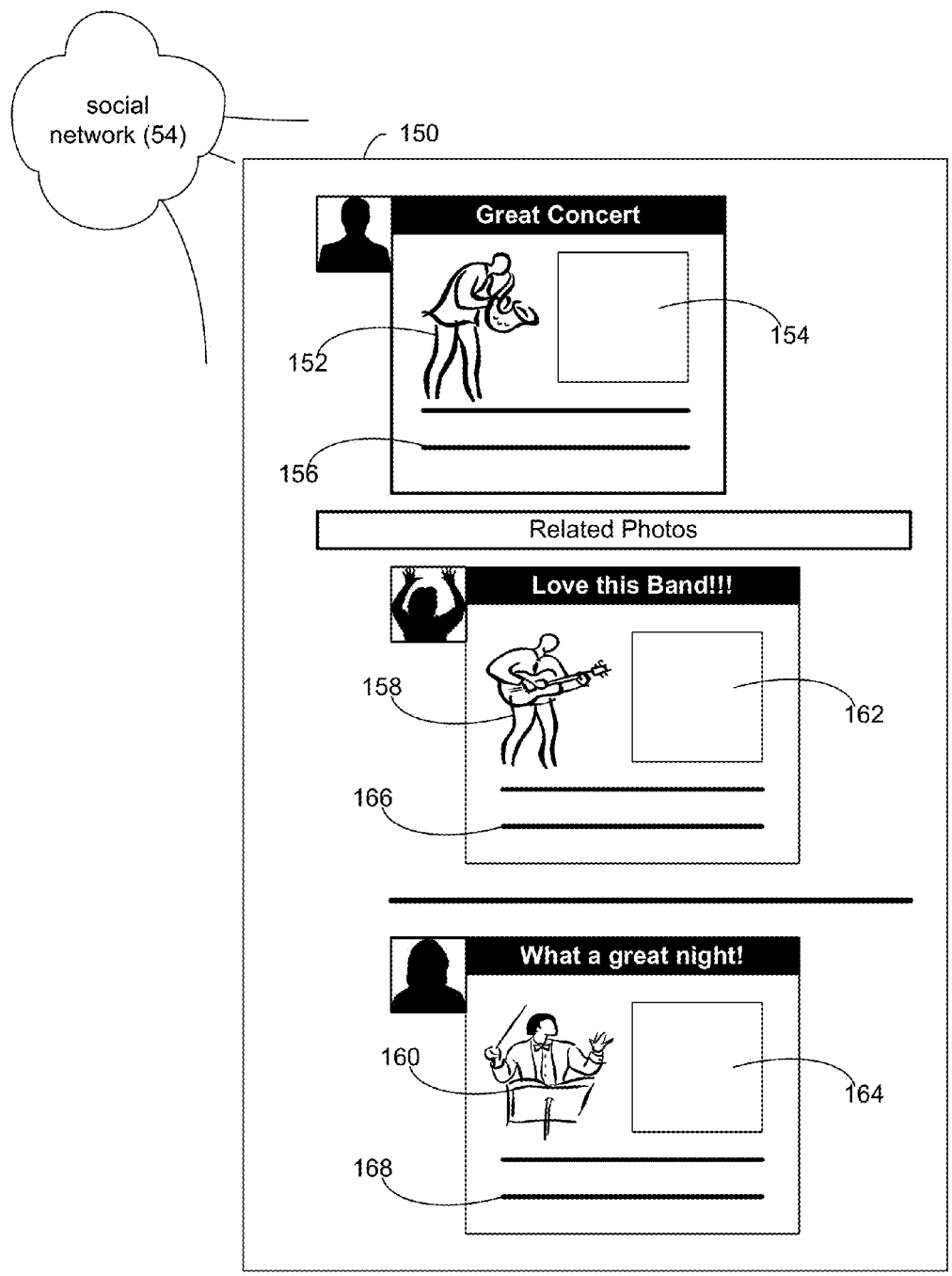

In order to identify other images posted within social network 54 (chosen from plurality of images 56) that may be related to image 152, image comparison process 10 may compare 100 data 58 concerning image 152 within social network 54 to data 60 concerning plurality of images 56 within social network 54. As with data 58 concerning image 152, data 60 concerning plurality of images 56 may include metadata concerning the discrete images included within plurality of images 56 and/or user comments concerning the discrete images included within plurality of images 56. Once comparison 100 is complete, image comparison process 10 may identify 102 a subset of similar images (e.g., images 158, 160), chosen from plurality of images 56, based, at least in part, upon comparison 100 performed by image comparison process 10. Image comparison process 10 may present 104 (e.g., as shown in FIG. 3D) at least a portion of the subset of the similar images to a computing device associated with the user providing the commentary.

Continuing with the above-stated example in which user 36 provides data 58 concerning image 152 (in the form of metadata 154), stating that "XYZ Band really rocked The Pier this past Saturday night", image comparison process 10 may make the above-described comparison 100 and identify 102 a subset of plurality of images 56 that includes image 158 and image 160.

When identifying 102 the subset of similar images, image comparison process 10 may: analyze 110 similarities between data concerning the first image within the social network and data concerning the plurality of images within the social network; analyze 112 social affinity between a user associated with the first image and one or more users associated with the plurality of images; and/or analyze 114 one or more credentials of a user associated with one or more of the plurality of images within the social network.

For example, each of image 158 and/or image 160 may have metadata (e.g., metadata 162, 164) associated with it. Further, each of image 158 and/or image 160 may have user comments (e.g., user comments 166, 168) associated with it. Accordingly, when identifying 102 a subset of similar images, image comparison process 10 may analyze 110 similarities between data (e.g., metadata 154 and user comments 156) concerning image 152 within social network 54 and data (e.g., the metadata and user comments) concerning each image included within plurality of images 56 within social network 54.

Continuing with this example, when identifying 102 a subset of similar images, image comparison process 10 may analyze 112 social affinity between user 36 (i.e., the user associated with image 152) and the users associated with the discrete images included within plurality of images 56. Accordingly, image comparison process 10 may more heavily weight images (included within plurality of images 56) for which metadata and/or user comments were provided by friends of user 36 within social network 54.

Additionally, when identifying 102 a subset of similar images, image comparison process 10 may analyze 114 one or more credentials of the users associated with the discrete images included within plurality of images 56. Accordingly, image comparison process 10 may more heavily weight images (included within plurality of images 56) for which metadata and/or user comments were provided by authorities within an area related to the image 154. As discussed above, image 152 is an image of a jazz concert. Accordingly, image comparison process 10 may more likely include within the above-described subset those images (chosen from plurality of images 56) for which metadata and/or user comments were provided by e.g., a music critic.

Upon image comparison process 10 identifying 102 a subset of similar images (e.g., images 158, 160), chosen from plurality of images 156, based, at least in part, upon comparison 100 performed by image comparison process 10, image comparison process 10 may present 104 at least a portion of the subset of the similar images to a computing device (e.g., desktop computer 28) associated with the user providing the commentary, thus allowing user 36 to review metadata and user comments concerning images (e.g., 158, 160) that are related to image 154.

As shown in FIG. 3D, the data presented 104 to e.g., user 36 by image comparison process 10 may be formatted in a hierarchical fashion that shows the original post concerning image 152 (by user 36), followed by the postings concerning images 158, 160 that were identified 102 by image comparison process 10 as being similar images.

Figure 4:
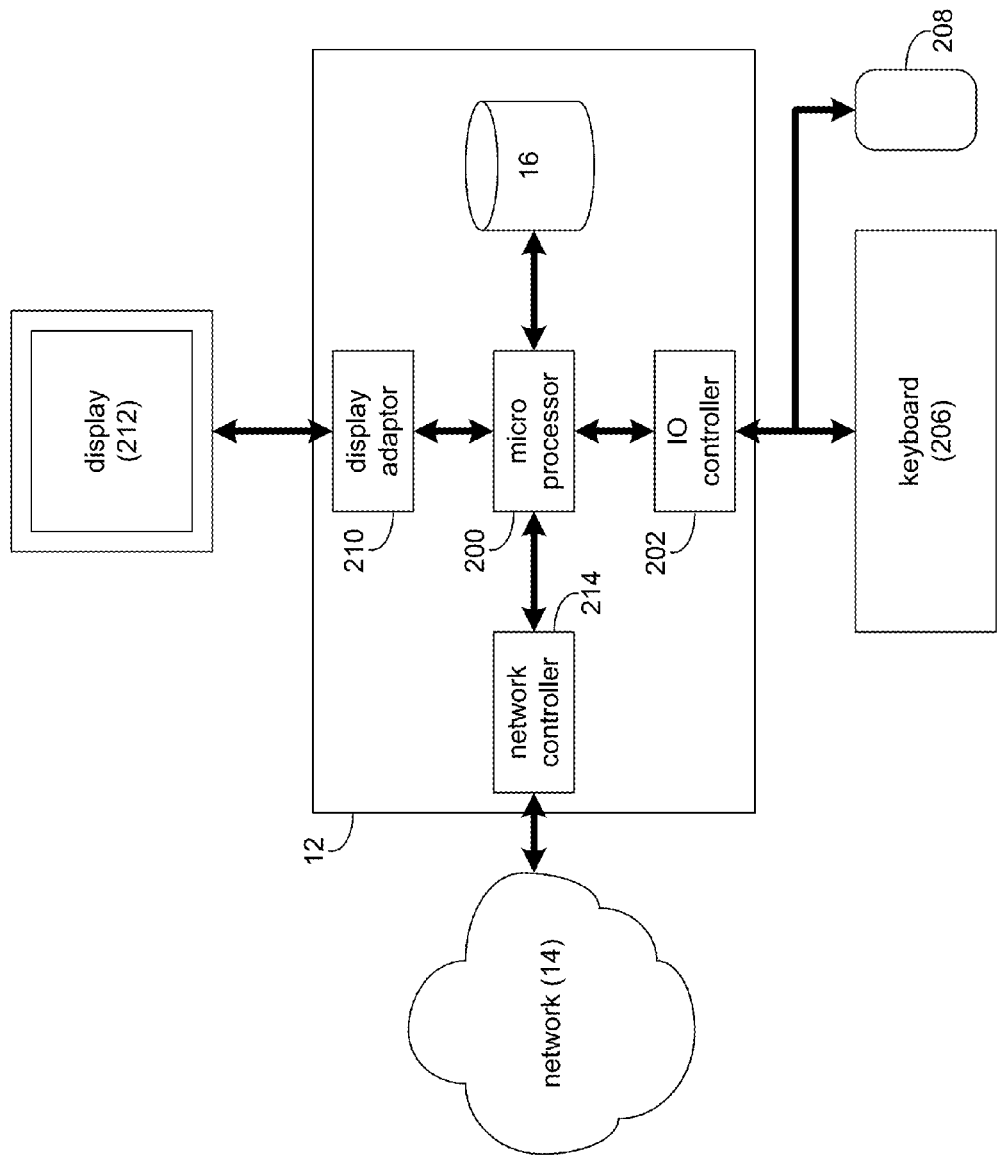
FIG. 4 is a diagrammatic view of the computing device of FIG. 1 according to an embodiment of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, image comparison process 10 may be substituted for computing device 12 within FIG. 4, examples of which may include but are not limited to client electronic devices 28, 30, 32, 34.

Computing system 12 may include microprocessor 200 configured to e.g., process data and execute instructions/code for image comparison process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 206, mouse 208, USB ports (not shown), and printer ports (not shown). Display adaptor 210 may be configured to couple display 212 (e.g., a CRT or LCD monitor) with microprocessor 200, while network adapter 214 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, on a computing device, data concerning a first image within a social network;
posting the data concerning the first image within the social network;
comparing, on the computing device, the data concerning the first image within the social network to data concerning a plurality of images within the social network, wherein the data concerning the plurality of images includes metadata and user comments;
identifying a subset of similar images, chosen from the plurality of images, based, at least in part, upon the comparison, wherein identifying a subset of similar images includes:
analyzing similarities between data concerning the first image within the social network and data concerning the plurality of images within the social network to generate the subset;
analyzing social affinity between a user associated with the first image and one or more users associated with the plurality of images;
based on the analyzing social affinity, heavily weighting one or more of the plurality of images that have at least one of: metadata provided by friends of the user associated with the first image within the social network and user comments provided by friends of the user associated with the first image within the social network; and
choosing the subset of similar images from the plurality of images, based at least in part on the heavily weighting; and
presenting at least a portion of the subset to a computing device associated with a user.

2. The computer-implemented method of claim 1 wherein presenting at least a portion of the subset comprises:
presenting the first image; and
presenting the portion of the subset, wherein the portion of the subset follows the first image.

3. A computer-implemented method comprising:
comparing, on a computing device, data concerning a first image within a social network to data concerning a plurality of images within the social network, wherein the data concerning the plurality of images includes metadata and user comments;
identifying a subset of similar images, chosen from the plurality of images, based, at least in part, upon the comparison wherein identifying a subset of similar images includes:
analyzing social affinity between a user associated with the first image and one or more users associated with the plurality of images;
analyzing one or more credentials of a second user of the one or more users associated with at least one of the plurality of images within the social network to determine whether the second user is an authority within an area related to the first image; and
in response to determination that the second user is an authority within the area related to the first image, heavily weighting the at least one of the plurality of images such that the at least one of the plurality of images is more likely included within the subset of similar images; and
presenting at least a portion of the subset to a computing device associated with a user.

4. The computer-implemented method of claim 3 further comprising:
receiving the data concerning the first image.

5. The computer-implemented method of claim 3, wherein presenting at least a portion of the subset comprises:
presenting the first image; and
presenting the portion of the subset, wherein the portion of the subset follows the first image and wherein the portion of the subset is formatted in a hierarchical fashion.

6. The computer-implemented method of claim 3 wherein the data concerning the first image includes metadata concerning the first image.

7. The computer-implemented method of claim 3 wherein the data concerning the first image includes user comments concerning the first image.

8. The computer-implemented method of claim 3 wherein identifying a subset of similar images includes:
based on the analyzing, heavily weighting one or more of the plurality of images that have at least one of: metadata provided by friends of the user associated with the first image within the social network and user comments provided by friends of the user associated with the first image within the social network.

9. The computer-implemented method of claim 8 wherein identifying a subset of similar images further includes:
choosing the subset of similar images from the plurality of images, based at least in part on the heavily weighting.

10. The computer-implemented method of claim 3 wherein identifying a subset of similar images includes:
analyzing similarities between data concerning the first image within the social network and data concerning the plurality of images within the social network.

11. The computer-implemented method of claim 3 wherein identifying a subset of similar images includes:
analyzing one or more credentials of a user associated with one or more of the plurality of images within the social network.

12. The computer-implemented method of claim 3 further comprising receiving the data concerning the first image.

13. The computer-implemented method of claim 3 further comprising posting the data concerning the first image within the social network.

14. The computer-implemented method of claim 3 wherein identifying a subset of similar images further includes:
analyzing similarities between data concerning the first image within the social network and data concerning the plurality of images within the social network.

15. A computing system including a processor and memory configured to perform operations comprising:
comparing data concerning a first image within a social network to data concerning a plurality of images within the social network, wherein the data concerning the plurality of images includes metadata and user comments;
identifying a subset of similar images, chosen from the plurality of images, based, at least in part, upon the comparison, wherein the identifying includes:
analyzing social affinity between a user associated with the first image and one or more users associated with the plurality of images;
based on the analyzing, heavily weighting one or more of the plurality of images that have at least one of: metadata provided by friends of the user associated with the first image within the social network and user comments provided by friends of the user associated with the first image within the social network; and choosing the subset of similar images from the plurality of images, based at least in part on the heavily weighting; and presenting at least a portion of the subset to a computing device associated with a user.

16. The computing system of claim 15 further comprising: receiving the data concerning the first image.

17. The computing system of claim 15 further comprising: posting the data concerning the first image within the social network.

18. The computing system of claim 15 wherein identifying a subset of similar images includes: analyzing one or more credentials of a user associated with one or more of the plurality of images within the social network.

19. The computing system of claim 15 wherein presenting at least a portion of the subset comprises:

presenting the first image; and presenting the portion of the subset, wherein the portion of the subset follows the first image.

20. The computing system of claim 15 wherein identifying a subset of similar images further includes:

analyzing similarities between data concerning the first image within the social network and data concerning the plurality of images within the social network.

\* \* \* \* \*